US012586276B2

(12) United States Patent
Wilk et al.

(10) Patent No.: US 12,586,276 B2
(45) Date of Patent: Mar. 24, 2026

(54) SYSTEM, METHOD AND/OR COMPUTER READABLE MEDIUM FOR MITIGATION OF EFFECTS FROM PHOTON SEPTAL PENETRATION IN SPECT IMAGING

(71) Applicant: GE Precision Healthcare LLC, Waukesha, WI (US)

(72) Inventors: Michael Wilk, Haifa (IL); Yariv Grobshtein, Haifa (IL); Ayeleth Devir-Wolfman, Nes Ammim (IL)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 187 days.

(21) Appl. No.: 18/621,326

(22) Filed: Mar. 29, 2024

(65) Prior Publication Data

US 2025/0308095 A1      Oct. 2, 2025

(51) Int. Cl.
*G06T 11/00*      (2006.01)
*G01T 1/161*      (2006.01)
*G01T 1/29*      (2006.01)
(52) U.S. Cl.
CPC ............ *G06T 11/005* (2013.01); *G01T 1/161* (2013.01); *G01T 1/2985* (2013.01); *G06T 2207/10108* (2013.01)
(58) Field of Classification Search
CPC ......... G06T 11/005; G06T 2207/10108; G01T 1/161; G01T 1/2985
See application file for complete search history.

(56) References Cited

U.S. PATENT DOCUMENTS 8,958,622 B2    2/2015  Vija et al.
10,772,580 B2    9/2020  Rong et al.

FOREIGN PATENT DOCUMENTS

CN          109394254 A      9/2022
JP          2011235088 A    * 11/2011    ........... G06T 11/005
JP          2022045163 A    * 3/2022    ........... G01T 1/2985

OTHER PUBLICATIONS

Jaszczak et al., "SPECT: Single Photon Emission Computed Tomography", IEEE Transactions on Nuclear Science (vol. 27, Issue: 3, pp. 1137-1153 (Year: 1980).*

(Continued)

*Primary Examiner* — Kiho Kim
(74) *Attorney, Agent, or Firm* — Daugherty & Del Zoppo, Co. LPA

(57)      ABSTRACT
A single photon emission computed tomography (SPECT) imaging system includes a detector configured to receive photons emitted by a radiopharmaceutical in an examination region and convert the received photons to measured projection data and a collimator with septa spatially arranged with respect to each other and the detector to provide channels to pass photons that traverse the channels and absorb photons that impinge the septa. A first sub-set of the photons emitted by the radiopharmaceutical traverse the channels without impinging the septa and are directly received by the detector. A second sub-set of the photons emitted by the radiopharmaceutical traverse the septa and are received by the detector. The SPECT imaging system further includes a reconstructor configured to discard scatter photons and the second sub-set of photons traversing the septa, and iteratively reconstruct an image based on the first subset of photons that are directly received by the detector.

20 Claims, 10 Drawing Sheets

(56)            References Cited

OTHER PUBLICATIONS

He et al., A Monte Carlo and physical phantom evaluation of quantitative In-111 SPECT, Physics in Medicine & Biology, Aug. 23, 2005, 6 sheets, vol. 50, No. 17, 2005 IOP Publishing Ltd . . . .
Hutton, et al., Review and current status of SPECT scatter correction, Physics in Medicine and Biology, Jun. 23, 2011, 29 sheets, vol. 56, IOP Publishing, online at stacks.iop.org/PMB/56/R85.
Larsson, et al., Correction for scatter and septal penetration using convolution subtraction methods and model-based compensation in 123 I brain SPECT imaging—a Monte Carlo study, Physics in Medicine & Biology, Oct. 19, 2006, 5 sheets, vol. 51, No. 22, 2006 IOP Publishing Ltd . . . .

* cited by examiner

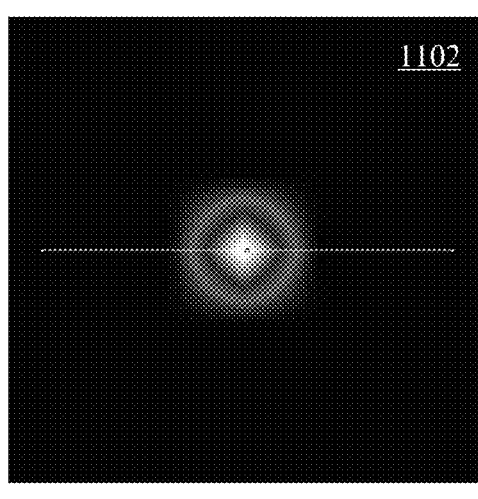
FIGURE 11
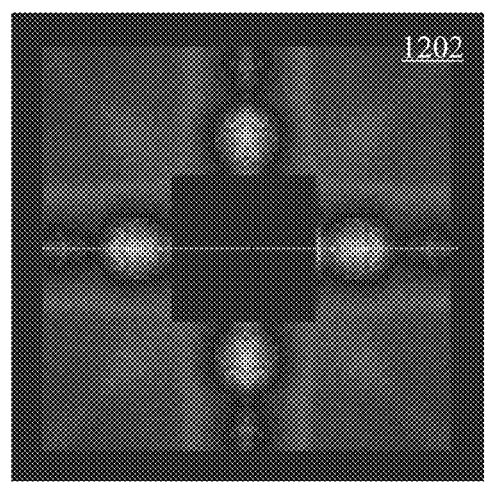
FIGURE 12
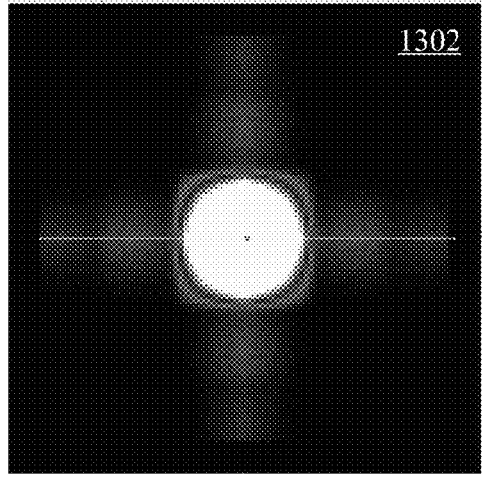
FIGURE 13
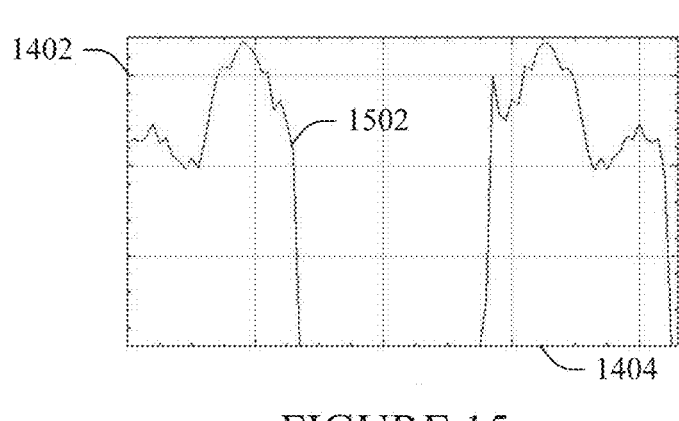
FIGURE 14
FIGURE 15
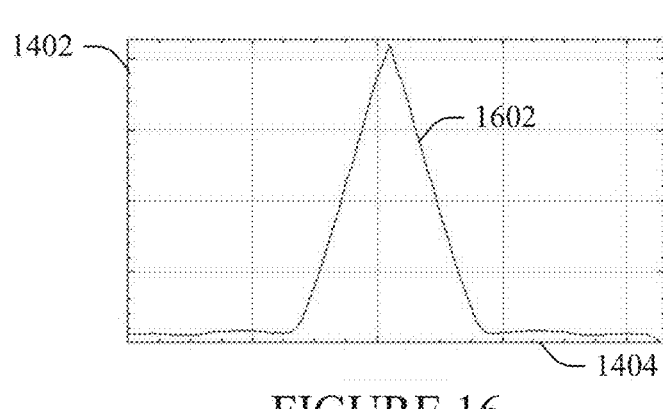
FIGURE 16

— 2102

— 2202

SYSTEM, METHOD AND/OR COMPUTER READABLE MEDIUM FOR MITIGATION OF EFFECTS FROM PHOTON SEPTAL PENETRATION IN SPECT IMAGING

FIELD

The following generally relates to single photon emission computed tomography (SPECT), and finds particular application with mitigating effects from photon septal penetration in SPECT imaging.

BACKGROUND

Single photon emission computed tomography (SPECT) imaging provides a non-invasive approach to collect functional information at the molecular and cellular level. In one example, a SPECT imaging system includes at least one detector that rotates around a patient positioned in an examination region, detects photons emitted by a radiopharmaceutical administered to a patient in a region of interest of the patient over a plurality of angles and outputs a signal indicative of the detected radiation (projection data), and a reconstructor that reconstructs the projection data to generate a two-dimensional (2-D) axial slice and/or three-dimensional (3-D) volumetric imaging data of biological activity in the region of interest of the patient.

In one example, a SPECT imaging system configured with an indirect conversion detector includes a scintillation crystal that converts photons such as X-rays and gamma rays to the light photons. The crystal is optically coupled to a bank of photomultiplier tubes (PMTs) or a solid-state photodiode (PD) array that converts the light photons into electrical signals indicative of an energy of the gamma rays. The crystal further coupled to a collimator. The collimators include septa that are spatially arranged with respect to each other (e.g., parallel, converging, diverging, pinhole, etc.) to provide channels in certain directions that pass photons, allowing them to reach the crystal, while absorbing most of the photons. For a SPECT imaging system configured with a direct conversion, the detector includes a direct conversion material such as Cadmium Zinc Telluride (CZT) instead of the scintillation crystal/photodetector pair.

FIG. 1 schematically illustrates an example of a detector 102 with a scintillation crystal 104 and a collimator 106 having septa $108_1, \ldots, 108_i, 108_j \ldots, 108_l, \ldots, 108_r, \ldots,$ and $108_n$, where "n" is a positive integer and "i," "j," "l" and "r" are indices into "n". A radiopharmaceutical 110 emits photons, including a photon $110_1, \ldots,$ a photon $110_k, \ldots,$ and a photon $110_m$, where "m" is a positive integer and "k" is an index into "m". The photon $110_1$ passes only through a channel 112 defined by the septa $108_i$ and $108_j$ of the collimator 106 and is received by the scintillation crystal 104. A photon that directly impinges on the detector, i.e., without impinging any septa, such as the photon $110_1$, is referred to as a direct photon.

The photon $110_k$ impinges on and is completely absorbed by the septa $108_1$. The photon $110_m$ impinges on the septa $108_r$, is only partially attenuated by the septa $108_r$, and is detected by the scintillation crystal 104. Partial absorption of a photon by septa is referred to herein as photon septal penetration, and that photon (e.g., the photon $110_m$) is referred to herein as a penetrated photon. In general, all measured projections include both direct photons and penetrated photons. Unfortunately, penetrated photons, such as the photon $110_m$, tend to deteriorate image contrast and a quantitative accuracy where the system matrix includes direct photon information and does not include penetrated photon information.

An approach to mitigate the above-noted consequences of penetrated photons includes utilizing penetration photon information in the system matrix (in addition to direct photon information) during an iterative reconstruction, in both the forward projection and the backprojection steps. The system matrix, which is a physical model of the system, can be obtained using known approaches, e.g., via measurements, simulations (e.g., Monte Carlo) or a combination thereof. With this approach, both direct photons and penetrated photons, together, are used to generate the reconstructed image, and the penetrated photons provide correct spatial information regarding activity distribution.

The approach including both direct photon information and penetrated photon information in the system matrix can improve image contrast and quantitative accuracy, relative to the approach in which the system matrix does not include penetrated photon information. To generate quantitative images with accurate quantitative information, corrections such as scatter correction, attenuation correction, resolution correction, etc. are applied. However, when simultaneously correcting for scatter photons and using penetrated photons for creating a reconstructed image, there will be residual contamination in the image because the system is unable to differentiate between penetrated photons and scatter photons, reducing quantitative information accuracy.

In view of at least the foregoing, there is an unresolved need for an improved approach for mitigating effects from photon septal penetration in SPECT imaging.

SUMMARY

Aspects of the application address the above matters, and others. This summary introduces concepts that are described in more detail in the detailed description. It should not be used to identify essential features of the claimed subject matter, nor to limit the scope of the claimed subject matter.

In one aspect, a single photon emission tomography (SPECT) imaging system includes a detector configured to receive photons emitted by a radiopharmaceutical in an examination region of the SPECT imaging system and convert the received photons to measured projection data. The SPECT imaging system further includes a collimator with septa spatially arranged with respect to each other and the detector to provide channels to pass photons emitted by a radiopharmaceutical that traverse the channels and absorb photons emitted by a radiopharmaceutical that impinge the septa. A first sub-set of the photons emitted by the radiopharmaceutical traverse the channels without impinging the septa and are directly received by the detector. A second sub-set of the photons emitted by the radiopharmaceutical traverse the septa and are received by the detector. The SPECT imaging system further includes a reconstructor configured to discard scatter photons, discard the second sub-set of photons traversing the septa, and iteratively reconstruct an image based on the first subset of photons that are directly received by the detector.

In one aspect, a computer-implemented method includes forward projecting a current image estimate to estimate projection data. The computer-implemented method further includes correcting the estimated projection data for collimator photon penetration. The computer-implemented method further includes correcting the estimated projection data for scattered photons. The computer-implemented method further includes comparing the corrected estimated projection data with measured projection data, wherein the measured projection data includes projections corresponding to direct photons passing through channels between septa in a collimator and septal photons traversing the septa and scattered photons. The computer-implemented method further includes backprojecting the comparison of the corrected estimated projection data and the measured projection data taking into account only the photons emitted by the radiopharmaceutical traverse the channels without impinging the septa and are directly received by the detector to generate an image update. The computer-implemented method further includes updating the current image estimate with the image update. The computer-implemented method further includes repeating the steps of forward projecting, correcting for collimator photon penetration, correcting for scatter photons, comparing, backprojecting and updating until iteration termination criteria is satisfied.

In another aspect, a computer readable medium is encoded with computer executable instructions. The computer executable instructions, when executed by a processor, cause the processor to: forward project a current image estimate to estimate projection data, correct the estimated projection data for collimator photon penetration, correct the estimated projection data for scatter photon, compare the corrected estimated projection data with measured projection data, wherein the measured projection data includes projections corresponding to direct photons passing through channels between septa in a collimator and septal photons traversing the septa and scattered photons, backproject the comparison of the corrected estimated projection data and the measured projection data taking into account only the photons emitted by the radiopharmaceutical traverse the channels without impinging the septa and are directly received by the detector to generate an image update, update the current image estimate with the image update, and repeat the steps of forward projecting, correcting for collimator photon penetration, correcting for scatter photons, comparing, backprojecting and updating until iteration termination criteria is satisfied.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings in which like references indicate similar elements.

FIG. 11 visually shows a PSF for direct photons.

FIG. 12 visually shows a PSF for septal penetration photons.

FIG. 13 visually shows a system PSF based on a combination of the PSFs of FIGS. 11 and 12.

FIG. 14 graphically shows a profile for the PSF for direct photons in FIG. 11.

FIG. 15 graphically shows a profile for the PSF for septal penetration photons in FIG. 12.

FIG. 16 graphically shows a system profile based on a combination of the profiles for the PSF of FIGS. 14 and 15

DETAILED DESCRIPTION

Single photon emission computed tomography (SPECT) imaging provides a non-invasive approach to collect functional information at the molecular and cellular level. As discussed above, an example SPECT imaging system includes at least one detector (indirect or direct conversion) that rotates around a patient positioned in an examination region, detects photons rays emitted by a radiopharmaceutical administered to a patient in a region of interest of the patient over a plurality of angles and outputs a signal indicative of the detected radiation (projection data), and a reconstructor that reconstructs the projection data to generate a two-dimensional (2-D) axial slice and/or three-dimensional (3-D) volumetric imaging data of biological activity in the region of interest of the patient.

As discussed herein, photons impinging on the septa that are only partially attenuated by the septa (septal penetration) can reach the detector. With systems with a system matrix that includes direct photon information but not penetrated photon information, the penetrated photons can deteriorate image contrast and quantitative accuracy. With systems with a system matrix that includes both direct photon information and penetrated photon information, image contrast and quantitative accuracy can be improved. However, for quantitative imaging, which includes scatter correction, the images reconstructed using the system matrix that models penetrated photon information will include residual contamination because the scatter correction method is not able to differentiate between penetrated photons and the scatter photons, reducing contrast and quantitative information accuracy.

Described herein is an approach that mitigates effects of photon septal penetration when applying scatter correction, by improving image contrast and the quantitative accuracy, relative to configurations not employing this approach. In general, the approach includes a dual matrix iterative reconstruction in which an initial image estimate is received as a current image estimate and forward projected using a system matrix that includes both direct photon and penetrated photon information, the resulting projection data is corrected for photon septal penetration and scatter, the corrected projection data is compared with measured projection data, the comparison is backprojected using only the part of the system matrix that includes direct photon information and not the penetrated photon information to determine a correction factor, the current image estimate is updated based on the correction factor, and the updated image estimate is employed as the current image estimate for a next iteration. The reconstruction continues until stopping or termination criteria is satisfied. Once stopped or terminated, the most recent updated image estimate is provided as an output reconstructed image.

Figure 2:
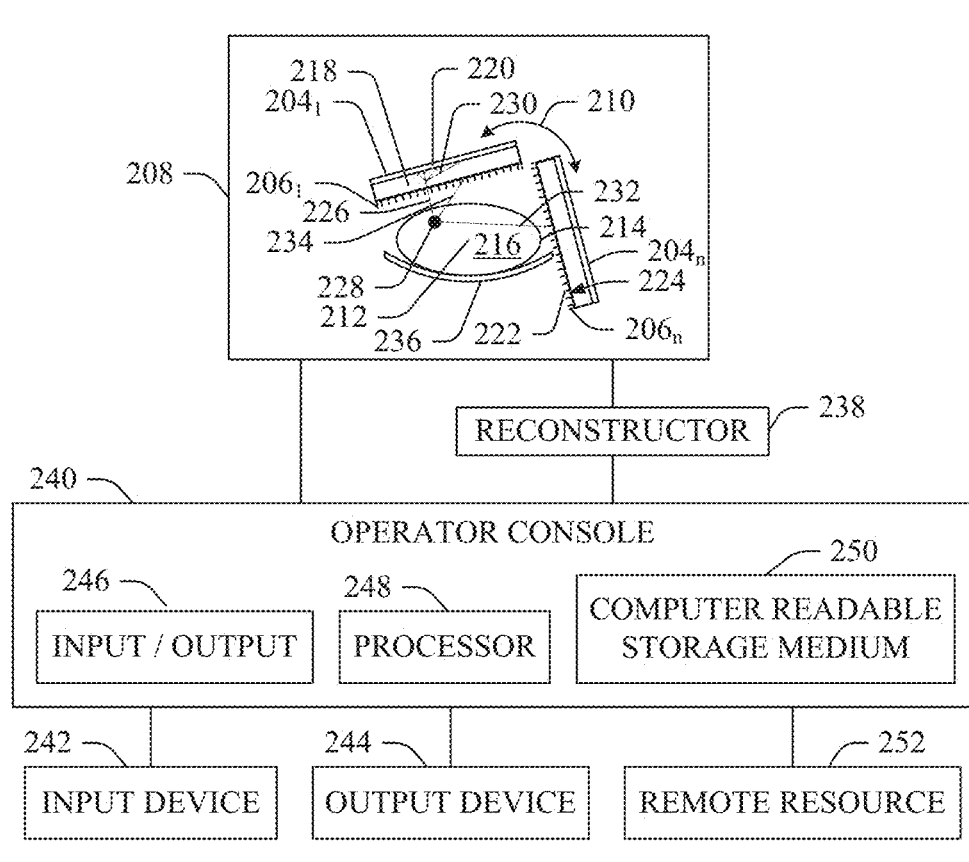
FIG. 2 schematically illustrates a non-limiting example of an imaging system configured for SPECT imaging that includes the reconstructor configured to mitigate effects from photon septal penetration, in accordance with an aspect of an embodiment(s) herein.

FIG. 2 schematically illustrates a non-limiting example of an imaging system 202 configured for SPECT. The imaging system 202 includes N scintillation cameras 2041, . . . , 204N, respectively with N collimators 2061, . . . , 206N, where N is an integer equal to or greater than one. Collectively, the N scintillation cameras 2041, . . . , 204N are referred to herein as scintillation cameras 204, and the N collimators 2061, . . . , 206N are referred to herein as collimators 206. Examples of N include one (1), two (2), three (3), etc.

The scintillation cameras 204 can be positioned ninety (90) degrees apart (as illustrated) or otherwise, e.g., forty-five (45), sixty (60), one hundred and eighty (180), etc. degrees, depending on the number of scintillation cameras. The scintillation cameras 204 are rotatably coupled to a gantry 208 and are configured to rotate 210 around an axis of rotation 212 about a subject 214 in an examination region 216. The scintillation cameras 204 are configured to acquire projections from a number of angles with respect to the examination region 216.

In one instance, the scintillation cameras 204 include a thallium-doped sodium iodide (NaI(TI)) scintillation crystal 218 that converts photons, such as X-ray and/or gamma rays, to light photons and a bank of photomultiplier tubes (PMTs) 220 that convert the light photons into electrical signals indicative of an energy of the photons. In another instance, the scintillation cameras 204 include a pixelated NaI(TI) scintillation crystal that converts such photons to the light photons and the PMTs 220 or solid-state photodiode (PD) array that converts the light photons into electrical signals (projection data) indicative of an energy of the photons.

The collimators 206 include septa 222 spatially arranged to provide channels 224 that pass photons 226 emitted by a radiopharmaceutical 228 in the subject 214. The septa 222 can be parallel (as illustrated), converging, diverging, pin-hole, etc. The septa 222 includes a high atomic number, high density material such as lead. Photons passing through the channels 224 (e.g., the photon 226) are absorbed in the scintillation crystal 218, which produces light photons 230 in response thereto, and photons impinging the septa 222 are either fully absorbed (e.g., a photon 232) or partially absorbed (e.g., a photon 234) by the septa 222.

The imaging system 202 further includes a subject/object support 236 configured to support the subject 228 or object before, during and/or after an imaging examination. Where the subject 214 is loaded onto the support 236, the support 236 moves into the examination region 216 such that the center of the subject in an axial direction approximately aligning with the axis of rotation 212 for an imaging examination. After the imaging examination is performed, the support 236 moves out of the examination region 216 to unload the subject 214. In some instances, the support 236 is configured to support a standing, a sitting, a leaning and/or otherwise positioned subject.

A reconstructor 238 reconstructs the projection data to produce image data. Suitable reconstruction algorithms include an iterative image reconstruction algorithm such as Ordered Subset Expectation Maximization (OSEM), a block sequential regularized expectation maximization (BSREM) algorithm, a maximum likelihood expectation maximization (MLEM) algorithm, etc., an algebraic reconstruction technique (ART), an analytic image reconstruction algorithm such as filtered backprojection (FBP), etc., another algorithm and/or a combination thereof. At least one of the reconstruction algorithms is configured to mitigate effects from photon septal penetration. This approach is referred to herein as a dual system matrix reconstruction.

As discussed, photon septal penetration tends to deteriorate image contrast and a quantitative accuracy, and existing approaches for mitigating this (e.g., including photon penetration information in the system matrix), when also applying scatter correction, suffer from residual contamination in the reconstructed image data because the system is unable to accurately differentiate between penetrated photons and the scatter photons. As described in greater detail below, the dual system matrix reconstruction algorithm discards penetration photons during the reconstruction. In one instance, the dual system matrix reconstruction algorithm provides more accurate quantification results (and accurate quantification is desired for theranostic imaging, e.g., with isotopes having a plurality of energy peaks, including medium and high energy peaks) and includes less contamination relative to a configuration that does not employ the dual system matrix reconstruction algorithm for quantitative imaging. Also further described below, the dual system matrix reconstruction algorithm can reduce the number of iterations it takes to reach given image quality based stopping criteria, relative to a configuration that does not employ the dual system matrix reconstruction algorithm.

A computing system, e.g., a computer, a workstation, a server, or the like, serves as an operator console 240. The operator console 240 includes an input device 242 such as a keyboard, mouse, touchscreen, microphone, etc., and an output device 244 includes a human readable device such as a display monitor or the like. The operator console 240 further includes input/output (I/O) 246 configured for transmitting and/or receiving signals and/or data, e.g., via the input device 242, output device 244, wireless technology, portable devices, etc.

The operator console 240 further includes a processor 248 such as a central processing unit (CPU), a graphics processing unit (GPU), a micro-processing unit (μPU), etc., and a computer readable storage medium 250 (memory), which includes non-transitory medium (e.g., a storage cell, device, etc.) and excludes transitory medium (i.e., signals, carrier waves, and the like). The computer readable storage medium 250 is encoded with computer executable instructions. Software resident in the computer readable storage medium 250 allows for controlling an operation of the imaging system 202, e.g., selecting a scan protocol including the dual system matrix reconstruction algorithm described herein, and/or otherwise interacting with the imaging system 202.

The imaging system 202 is in electrical communication with a remote resource 252. In one instance, the remote resource 252 includes a radiology information system (RIS), a hospital information system (HIS), an electronic medical record (EMR), a picture archiving and communication system (PACS), a server, a database, a cloud-based resource, etc. The operator console 240 is configured to transmit and/or receive information to and/or from the remote resource 252, e.g., via Digital Imaging and Communications in Medicine (DICOM) protocol and/or other protocol.

Figure 3:
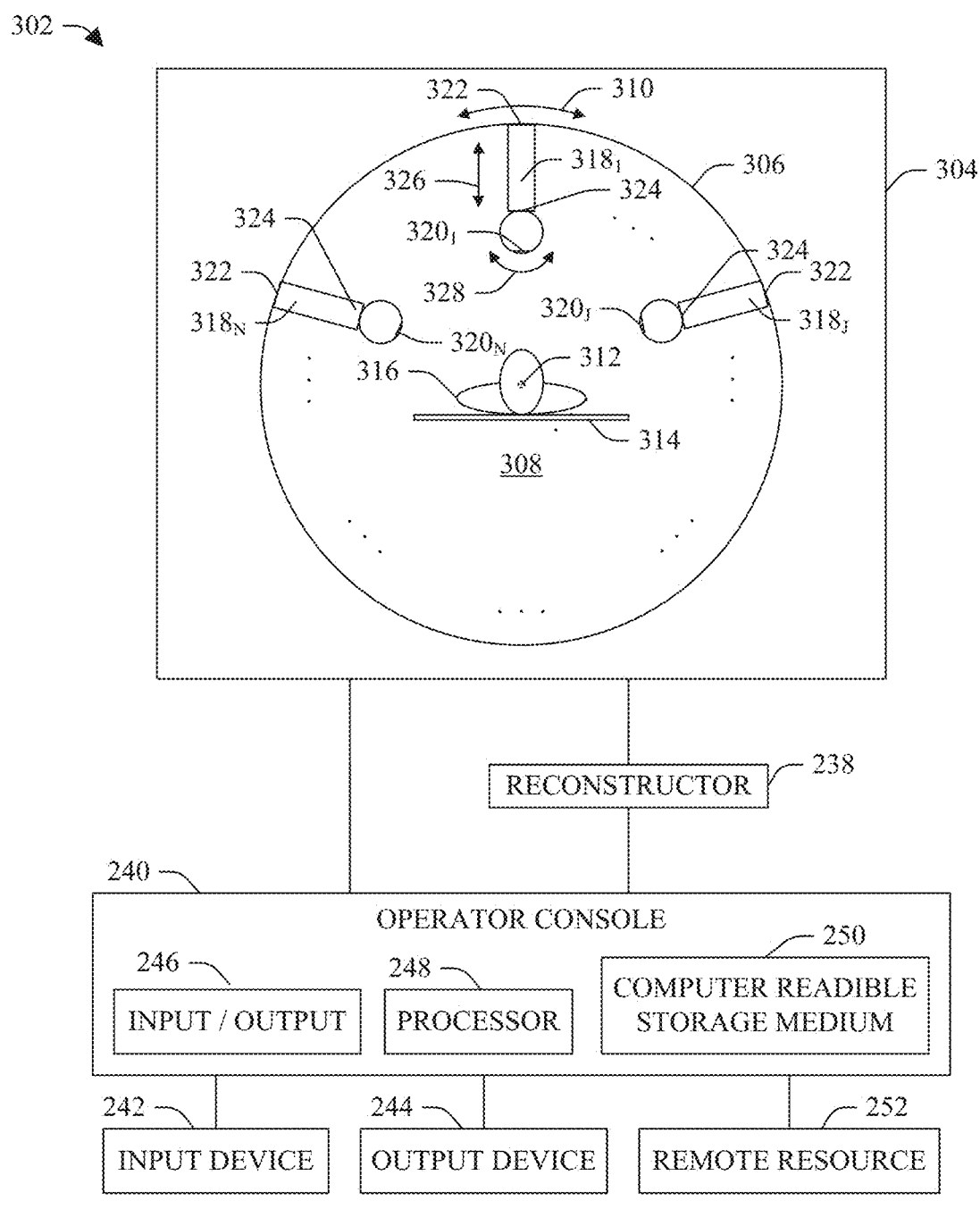
FIG. 3 schematically illustrates another non-limiting example of an imaging system configured for SPECT imaging that includes the reconstructor configured to mitigate effects from photon septal penetration, in accordance with an aspect of an embodiment(s) herein.

FIG. 3 schematically illustrates another example of an imaging system 302 configured for SPEC imaging. The imaging system 302 includes a gantry 304 and a frame 306. In one instance, the frame 306 includes an annular ring with an inner material free region (a bore, an aperture, an opening, etc.) that serves as an examination region 308, is rotatably supported by the gantry 304, e.g., via a bearing or the like, and is configured to rotate 310 around the examination region 308 about a rotational axis 312. In some instances, the gantry 304 is otherwise shaped such as "C," "H," "L" and/or otherwise shaped.

The imaging system 302 further includes a subject/object support 314 configured to support a subject 316 or object before, during and/or after an imaging examination. Where the subject 316 is loaded onto the support 314, the support 314 moves into the examination region 308 such that the center of the subject in an axial direction approximately aligning with the axis of rotation 312 for an imaging examination. After the imaging examination is performed, the support 314 moves out of the examination region 308 to unload the subject 316. In some instances, the support 314 is configured to support a standing, a sitting, a leaning and/or otherwise positioned subject.

The imaging system 302 further includes N elongate support arms 318$_1$, . . . , 318$_J$, . . . , 318$_N$ and N scintillation cameras 320$_1$, . . . , 320$_J$, . . . , 320$_N$, where N is an integer equal to or greater than one. Collectively, the N support arms 318$_1$, . . . , 318$_J$, . . . , 318$_N$ are referred to herein as support arms 318, the N gamma cameras 320$_1$, . . . , 320$_J$, . . . , 320$_N$ are referred to herein as scintillation cameras 320. The support arms 318 include first ends 322 and second ends 324, which spatially oppose the first ends 322. The first ends 322 are supported by the rotating frame 306 and are angularly spaced apart from each other around the frame 306. The second ends 324 support the scintillation cameras 320. The support arms 318 and scintillation cameras 320 rotate in coordination with the rotating frame 306 about the rotational axis 312.

The support arms 318 are each configured to extend and retract radially 326 between the rotating frame 306 and the axis of rotation 312, where extending a support arm 318 moves the respective scintillation camera 320 towards and closer to the axis of rotation 312 and hence the subject 316 and retracting a support arm 318 moves the respective scintillation camera 320 away from the axis of rotation 312. Such movement can be provided via an actuator such as an actuator that converts rotary motion into linear displacement, an actuator with a hollow cylinder and a piston, and/or the like.

The scintillation cameras 320 are moveably affixed to the second ends 324 of the support arms 318. In one instance, the scintillation cameras 320 are configured to swivel 328 (sweep, pivot, rotate, or the like) at the second ends 324 of the support arms 318. The movement of the scintillation cameras 320 can be independently controlled such that one scintillation camera 320 can, e.g., swivel, while one or more of the remaining N−1 scintillation cameras 320 remains stationary. However, one or more of the scintillation cameras 320 can be moved in coordination with each other. Swiveling a scintillation camera 320 focuses a detection surface of the gamma camera in the examination region 308 along particular paths of gamma rays from the subject 316. The scintillation cameras 320 may be different sizes and/or shapes with respect to each other.

In one instance, each of the scintillation cameras 320 includes one or more modules or tiles (not visible), and each of the modules includes one or more radiation detectors (not visible), a collimator (not visible) and electronics (not visible). In one instance, the radiation detectors include a direct conversion material such as cadmium zinc telluride (CZT) with a plurality of pixels, the collimators include material free channels that allow radiation to pass unobstructed and septa therebetween configured to absorb and attenuate radiation impinging thereon, and the electronics route electrical signals indicative of detected radiation off the scintillation cameras 320.

Similar to the collimators 206 described in connection with FIG. 2, the collimator (not visible) is configured to pass certain photons and block other photons, and is susceptible to septal penetration, which, again tends to deteriorate image contrast and a quantitative accuracy. In general, incident photons deposit their energy in the pixel crystal lattice generating pairs of charge carriers, an applied electric field collects the charge carriers to produce a current pulse, and, since, the current pulse comes from a single pixel, its position is known.

The reconstructor 238 and the operator console 240 are substantially similar to the reconstructor 238 and the operator console 240 described in connection with FIG. 2. For sake of completeness, the description of the reconstructor 238 and the operator console 240 is summarized next.

The reconstructor 238 is configured to reconstruct the projection data to produce image data. Suitable reconstruction algorithms include an iterative image reconstruction algorithm such as an OSEM algorithm, a BSREM algorithm, a MLEM algorithm, etc., an algebraic reconstruction technique (ART), an analytic image reconstruction algorithm such as FBP, etc., another algorithm and/or a combination thereof.

The operator console 240 includes the input device 242, the output device 244, and I/O 246. The operator console 240 further includes a processor 248 and the computer readable storage medium 250. The imaging system 202 is in electrical communication a RIS, a HIS, an EMR, a PACS, a server, a database, a cloud-based resource, etc., and is configured to communicate therewith via DICOM and/or other otherwise.

Figures 4, 5:
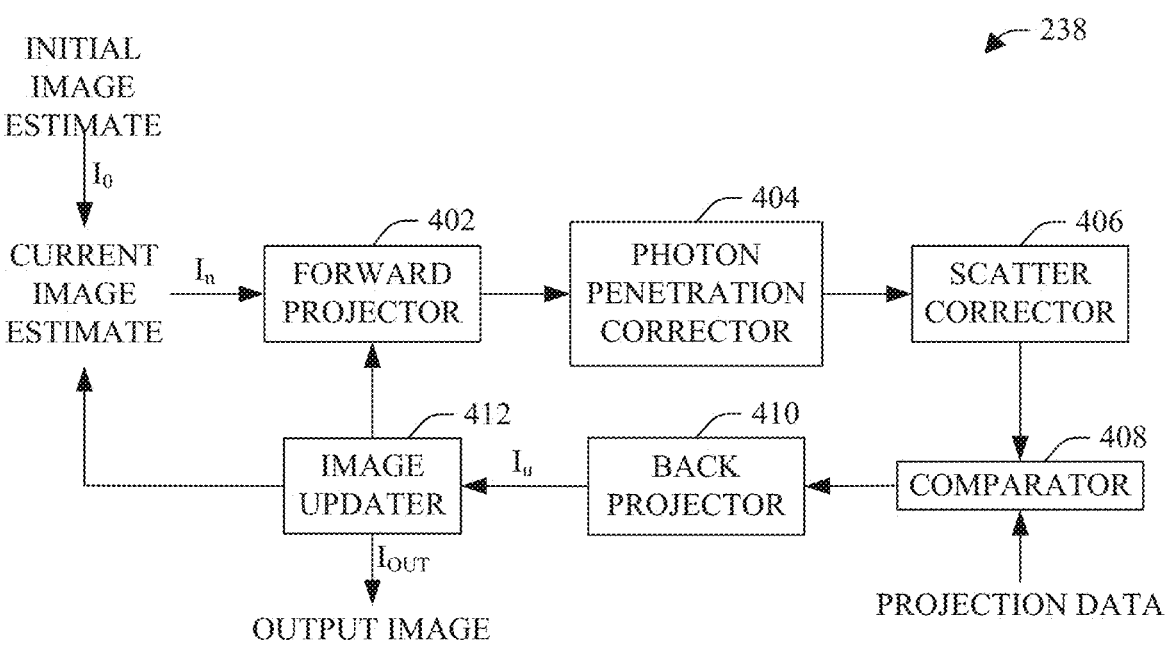
FIG. 4 schematically illustrates a non-limiting example of the reconstructor configured to mitigate effects from photon septal penetration, in accordance with an aspect of an embodiment(s) herein.
FIG. 5 schematically illustrates another non-limiting example of the reconstructor configured to mitigate effects from photon septal penetration, in accordance with an aspect of an embodiment(s) herein.

Turning to FIG. 4, a non-limiting example of the reconstructor 238 is schematically illustrated. The reconstructor 238 includes a set of reconstruction algorithms, including at least the dual system matrix reconstruction described herein, which, as briefly described above, discards penetration photons during the reconstruction. The reconstruction algorithm is an interactive reconstruction algorithm and includes a forward projector 402, a photon penetration corrector 404, a scatter corrector 406, a comparator 408, a back projector 410, and an image updater 412.

Initially, the forward projector 402 receives as input, an initial image estimate ($I_0$) as a current image estimate ($I_n$). Values of the pixels/voxels of the initial image estimate can be randomly or arbitrarily initialized, e.g., a uniform image initialized to all ones (1's), etc. The forward projector 402 forward projects the initial image estimate to produce a projection data estimate. The photon penetration corrector 404 corrects the projection data estimate for photon septal penetration. The photon scatter corrector 406 corrects the photon septal penetration corrected projection data for scatter.

The comparator 408 compares the septal penetration and scatter corrected projection data and the measured projection data. In one instance, the comparison includes determining a ratio of the septal penetration correction projection data to the measured projection data. The back projector 410 back-projects the comparison (ratio) of the septal penetration correction projection data to the measured projection data, generating an image update ($I_u$). The image updater 412 generates a next image estimate based on the current image estimate ($I_n$) and the image update ($I_u$).

The next image estimate is used as the current image estimate ($I_n$) for the next iteration. The process continues until stopping or terminating criteria is reached. The stopping or terminating criteria includes at least one of a maximum number of iterations, a maximum amount of time, etc. Upon termination of the iterative process, the last or most recent image estimate ($I_{out}$) is output and displayed, archived, filmed, etc.

The following describes an example of the algorithm. The projection formation can be represented as shown in EQUATION 1:

$$P=H*I+\xi, \qquad \text{EQUATION 1:}$$

where I represents a 3-D voxel based unknown image, P represents a pixel based projection data, H represents a system matrix, and $\xi$ represents a statistical noise vector. The reconstruction task is to find I, given P, by an iterative optimization process. For H, $h_{ij}$ represents a probability of photon emitted from the voxel i in the image I to get registered by the detector into the pixel j of the projection P.

EQUATION 1 can be rewritten as EQUATION 2:

$$P=H_p*I+P_{SC}+\xi, \qquad \text{EQUATION 2:}$$

where $H_p$ represents a projection matrix of primary photons including attenuation effect A, and $P_{SC}$ represents projections of scattered photons, which provide distorted spatial information. Attenuation correction is performed by inclusion of the attenuation effect A into system matrix $H_p$ during the iterative reconstruction process. The distribution of the scattered photons are estimated by acquisition of scattered data in separate energy windows, simulation, modelling of scattered photons distribution, modeling the scatter point spread function and estimating scattered photons projections etc. In one instance, scatter correction is achieved by adding estimated scatter projections $P_{SC}$ to re-projected data $P_n$ during the iterative reconstruction process.

With the reconstruction algorithm disclosed herein, $H_p$ is represented as shown in as EQUATION 3:

$$H_p=H_{geom}+H_{penetr}, \qquad \text{EQUATION 3:}$$

where $H_{geom}$ represents a collimator direct (geometrical) matrix, which represents a probability of a photon reaching the detector through a channel between septa and not septal penetration, and $H_{penetr}$ represents a collimator penetration matrix, which represents a probability of a photon reaching the detector through septa. EQUATION 2 can be rewritten as EQUATION 4 by substituting in EQUATION 3:

$$P=(H_{geom}+H_{penetr})*I+P_{SC}+\xi. \qquad \text{EQUATION 4:}$$

FIG. 5 schematically illustrates an embodiment of the reconstructor 238 based on EQUATION 4. In this embodiment, the photon septal penetration correction is computed in each iteration and applied to each iteration. In this embodiment, the forward projector 402 forward the projection data by computes $P_n=AH_{geom}*I_n$, the photon penetration corrector 404 corrects for septal penetration correction by computing $P_n=P_n+AH_{penetr}*I_n$, the scatter corrector 406 corrects for scatter by computing $P_n=P_n+P_{SC}$, the back projector 410 back projects the comparison of measured and calculated projections comprising scatter and penetrated photons by computing $DP*A(H_{geo})T$ to compute an image update $I_u$, and the image updater 412 updates the image by adding the image update to the image estimate through via $I_n=I_{n-1}*I_u$.

Figures 6, 7:
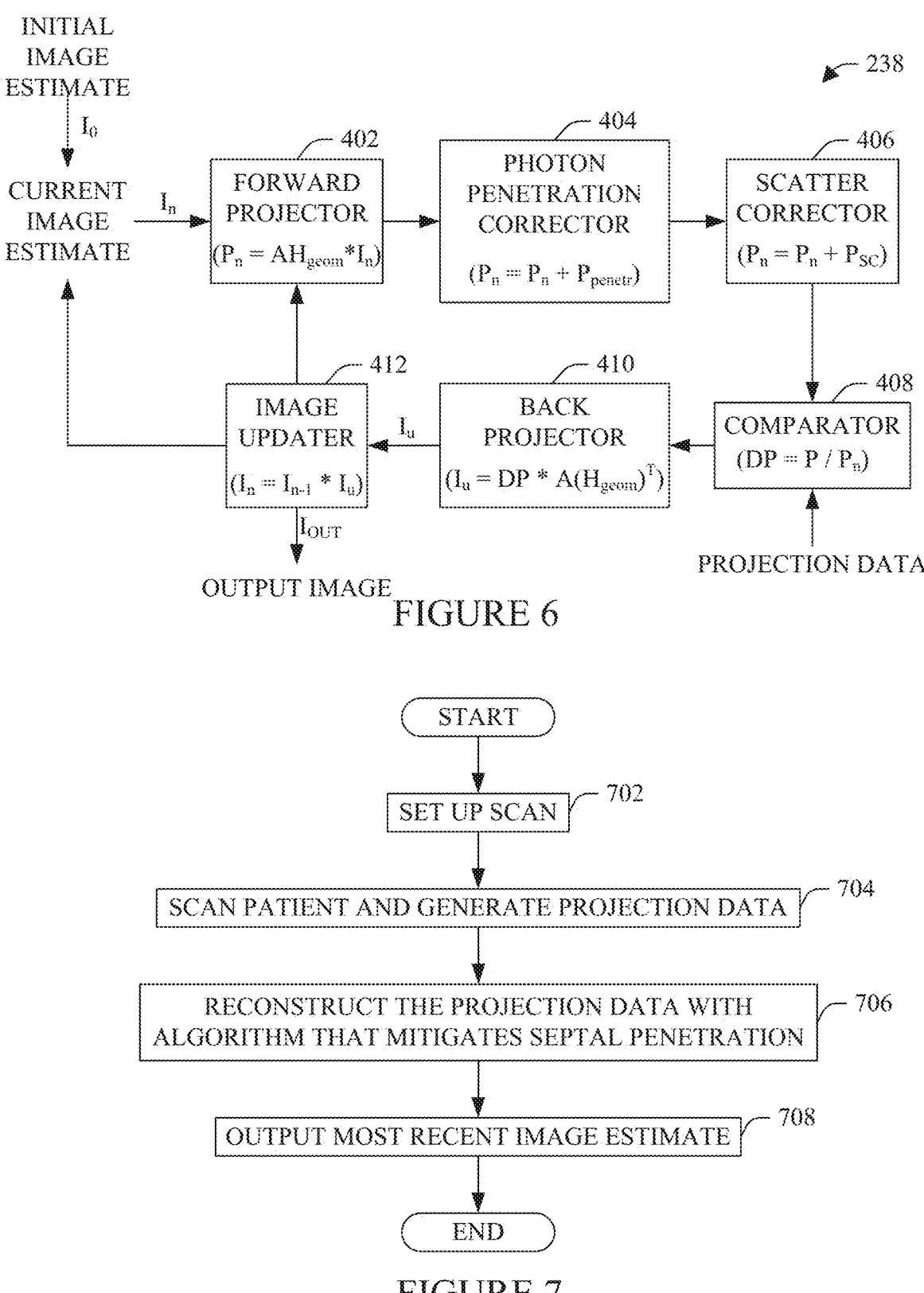
FIG. 6 schematically illustrates another non-limiting example of the reconstructor configured to mitigate septal penetration affects, in accordance with an aspect of an embodiment(s) herein.
FIG. 7 illustrates a non-limiting example of a flow chart for a computer-implemented method for reconstructing SPECT projection data while mitigating effects from photon septal penetration, in accordance with an embodiment(s) herein.

FIG. 6 schematically illustrates another embodiment of the reconstructor 238 based on EQUATION 4. In this embodiment, the photon septal penetration correction is a predetermined correction that is applied to each iteration. Similar to FIG. 5, the forward projector 402 forward the projection data by computes $P_n=AH_{geom}*I_n$, the scatter corrector 406 corrects for scatter by computing $P_n=P_n+P_{SC}$, the back projector 410 back projects the comparison of measured and calculated projections comprising scatter and penetrated photons by computing $DP*A(H_{geo})T$ to compute an image update $I_u$, and the image updater 412 updates the image by adding the image update to the image estimate through $I_n=I_{n-1}*I_u$.

However, in this embodiment, the photon penetration corrector 404 pre-determines the photon septal penetration correction prior to the iterative reconstruction process. In one instance, the photon penetration corrector 404 pre-determines the photon septal penetration correction based on initial estimation of penetration projections $P_{penetr}$. The photon penetration corrector 404 then corrects for septal penetration correction during the iterative reconstruction process by computing $P_n=P_n+P_{penetr}$.

FIG. 7 illustrates a non-limiting example of a flow chart for a computer-implemented method. It is to be appreciated that the ordering of the acts in the method is not limiting. As such, other orderings are contemplated herein. In addition, one or more acts may be omitted, and/or one or more additional acts may be included.

A radiopharmaceutical is administered to a patient, and the patient is loaded in the examination region 216 of the imaging system 202 (FIG. 2), the examination region 308 of the imaging system 302 (FIG. 3) or an examination region of another imaging system configured for SPECT imaging, as described herein and/or otherwise. For example, the patient is loaded on the support 236 of the imaging system 202 (FIG. 2) or the support 314 of the imaging system 302 (FIG. 3), which moves the patient into the examination region 216 or 308.

At 702, a scan of the patient is set up, as described herein and/or otherwise. For example, an operator of the operator console 240 (FIGS. 2 and 3) can employ the input device 242 (FIGS. 2 and 3) to select a scan protocol via an instance of a graphical user interface (GUI) of the application software stored in the computer readable storage medium 250 (FIGS. 2 and 3) presented by the processor 248 (FIGS. 2 and 3). The selected scan protocol may include, e.g., by default, the dual system matrix (iterative) reconstruction algorithm described herein, or the operator may choose it. At 704, the scan of the patient is performed, generating (measured) projection data, as described herein and/or otherwise.

At 706, the measured projection data is reconstructed via the dual system matrix (iterative) reconstruction algorithm, which discards septal penetration photons and generates an output image estimate, as described herein and/or otherwise. In one instance, this includes computing a photon septal penetration correction to each iteration (e.g., FIG. 5). In another instance, this includes computing a septal penetration correction only once and applying the same photon septal penetration correction to each iteration (e.g., FIG. 6). At 708, the most recent image estimate is output, e.g., in response to reconstruction algorithm iteration stopping or termination criteria being satisfied, as described herein and/or otherwise.

Figure 8:
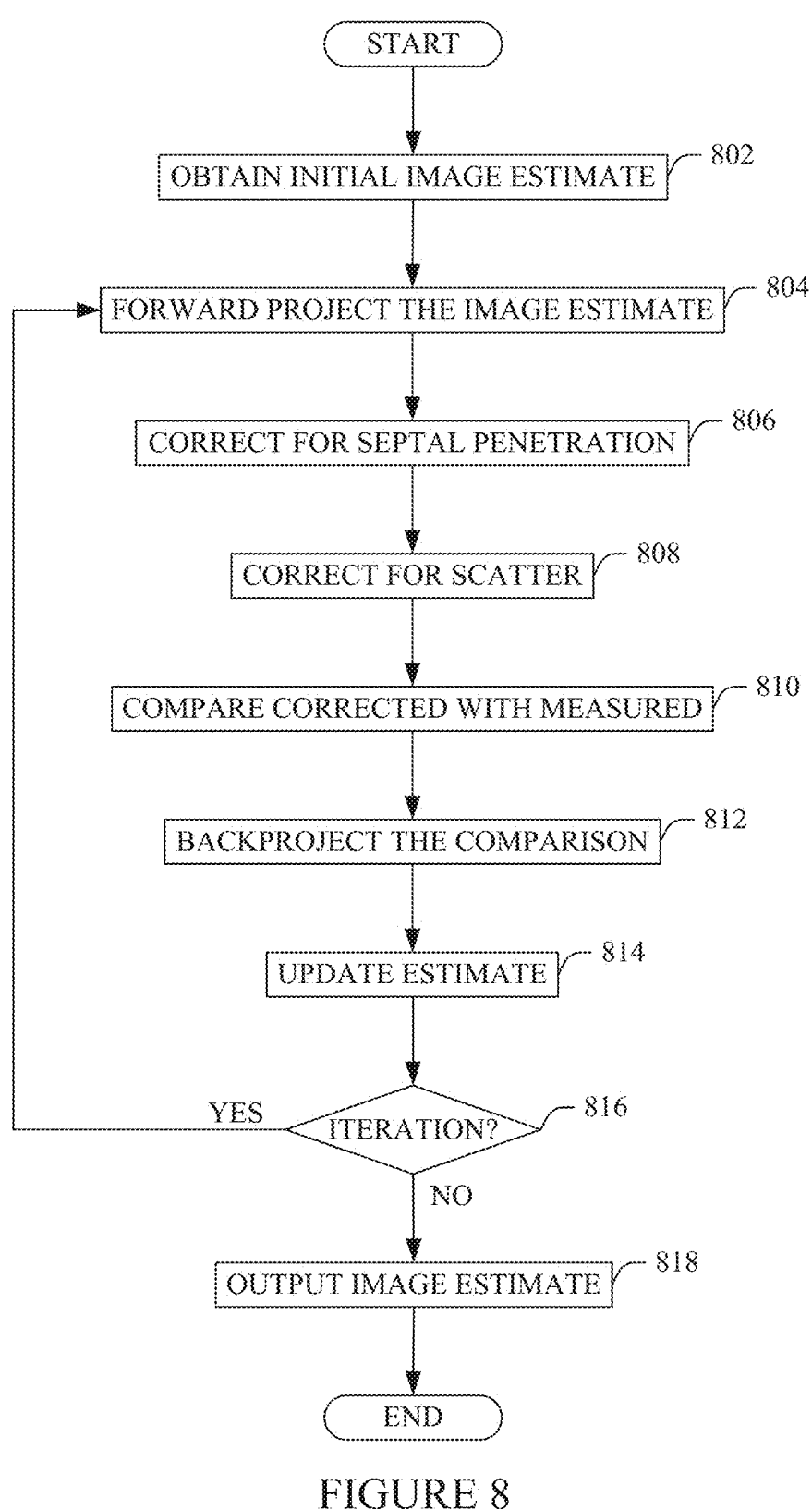
FIG. 8 illustrates another non-limiting example of a flow chart for a computer-implemented method for reconstructing SPECT projection data while mitigating effects from photon septal penetration, in accordance with an embodiment(s) herein.

FIG. 8 illustrates a non-limiting example of a flow chart for a computer-implemented method of the dual system matrix (iterative) reconstruction algorithm. It is to be appreciated that the ordering of the acts in the method is not limiting. As such, other orderings are contemplated herein. In addition, one or more acts may be omitted, and/or one or more additional acts may be included.

At 802, an initial image estimate is obtained as a current image estimate, as described herein and/or otherwise. Again, values of the pixels/voxels of the initial image estimate can be randomly or arbitrarily initialized, e.g., a uniform image initialized to all ones (1's), etc. At 804, the current image estimate is forward projected, as described herein and/or otherwise. At 806, the projection data is corrected for photon septal penetration, as described herein and/or otherwise. At 808, the projection data is corrected for scatter, as described herein and/or otherwise.

At 810, the photon septal penetration and scatter corrected projection data is compared with the measured projection data, as described herein and/or otherwise. At 812, the comparison is backprojected to produce an image update, as described herein and/or otherwise. At 814, the image estimate is updated based on the backprojected image, as described herein and/or otherwise. At 816, it is determined whether there will be another image estimate update, as described herein and/or otherwise.

If it is determined that there will be another image estimate update, then acts 804-816 are repeated with the updated image estimate as the current image estimate. If it is determined that there will not be another image estimate update, then at 818, the updated image estimate is output, as described herein and/or otherwise. As described herein, this reconstruction algorithm at least improves image contrast and/or reduces reconstruction time, relative to a configuration that does not employ this reconstruction algorithm, without adding residual background associated with septal penetration information.

Figures 9, 10:
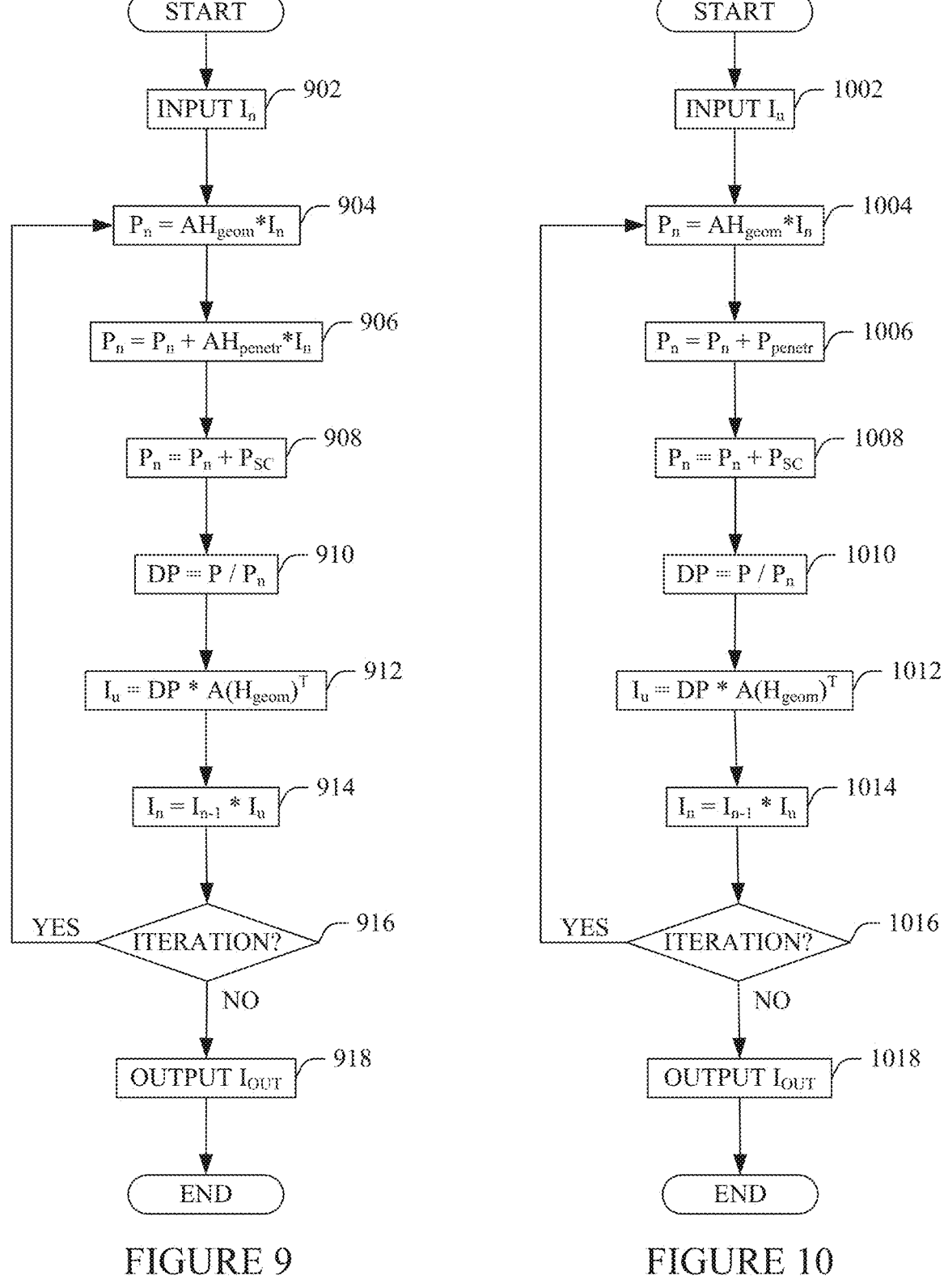
FIG. 9 illustrates yet another non-limiting example of a flow chart for a computer-implemented method for reconstructing SPECT projection data while mitigating effects from photon septal penetration, in accordance with an embodiment(s) herein.
FIG. 10 illustrates still another non-limiting example of a flow chart for a computer-implemented method for reconstructing SPECT projection data while mitigating effects from photon septal penetration, in accordance with an embodiment(s) herein.

FIG. 9 illustrates a non-limiting example of a flow chart for a computer-implemented method of the dual system matrix (iterative) reconstruction algorithm where septal penetration correction is determined and applied to each iteration. It is to be appreciated that the ordering of the acts in the method is not limiting. As such, other orderings are contemplated herein. In addition, one or more acts may be omitted, and/or one or more additional acts may be included.

At 902, an initial image estimate is obtained as a current image estimate $I_n$, as described herein and/or otherwise. Again, values of the pixels/voxels of the initial image estimate can be randomly or arbitrarily initialized, e.g., a uniform image initialized to all ones (1's), etc. At 904, the current image estimate is forward projected by computing $P_n = AH_{geom} * I_n$, as described herein and/or otherwise. At 906, the calculated projection data is corrected for photon septal penetration correction by computing $P_n = P_n + AH_{penetr} * I_n$, as described herein and/or otherwise. At 908, the photon septal penetration corrected projection data is corrected for scatter by computing $P_n = P_n + P_{SC}$, as described herein and/or otherwise.

At 910, the septal penetration and scatter corrected projection data is compared with the measured projection data by determining $DP = P/P_n$. At 912, the comparison is backprojected by computing $DP * A(H_{geo})T$ to compute an image update $I_u$, as described herein and/or otherwise. At 914, the image estimate is updated based on the comparison by determining $I_n = I_{n-1} * I_u$, as described herein and/or otherwise. At 916, it is determined whether there will be another image estimate update, as described herein and/or otherwise.

If it is determined that there will be another image estimate update, then acts 904-916 are repeated with the updated image estimate as the current image estimate. If it is determined that there will not be another image estimate update, then at 918, the updated image estimate $I_{out}$ is output, as described herein and/or otherwise. As described herein, this reconstruction algorithm at least improves image contrast and/or reduces reconstruction time, relative to a configuration that does not employ this reconstruction algorithm, without adding residual background associated with septal penetration information.

FIG. 10 illustrates a non-limiting example of a flow chart for a computer-implemented method of the dual system matrix (iterative) reconstruction algorithm where septal penetration correction is pre-determined and applied to each iteration. It is to be appreciated that the ordering of the acts in the method is not limiting. As such, other orderings are contemplated herein. In addition, one or more acts may be omitted, and/or one or more additional acts may be included.

At 1002, an initial image estimate is obtained as a current image estimate $I_n$, as described herein and/or otherwise. Again, values of the pixels/voxels of the initial image estimate can be randomly or arbitrarily initialized, e.g., a uniform image initialized to all ones (1's), etc. At 1004, the current image estimate is forward projected by computing $P_n = AH_{geom} * I_n$, as described herein and/or otherwise. At 1006, the calculated projection data is corrected for photon septal penetration correction by computing $P_n = P_n + P_{penetr}$, where $P_{penetr}$ is a precomputed value, as described herein and/or otherwise.

At 1008, the photon septal penetration corrected projection data is corrected for scatter by computing $P_n = P_n + P_{SC}$, as described herein and/or otherwise. At 1010, the photon septal penetration and scatter corrected projection data is compared with the measured projection data by determining $DP = P/P_n$, as described herein and/or otherwise. At 1012, the comparison is backprojected by computing $DP*A(H_{geo})T$ to compute an image update $I_u$, as described herein and/or otherwise. At 1014, the image estimate is updated based on the comparison by determining $I_n = I_{n-1}*I_u$, as described herein and/or otherwise.

At 1016, it is determined whether there will be another image estimate update, as described herein and/or otherwise. If it is determined that there will be another image estimate update, then acts 1004-1016 are repeated with the updated image estimate as the current image estimate. If it is determined that there will not be another image estimate update, then at 1018, the updated image estimate $I_{out}$ is output, as described herein and/or otherwise. In this example, $P_{penetr}$ is previously computed as $P_{penetr} = P_n + AH_{penetr}*I_n$, as described herein and/or otherwise. As described herein, this reconstruction algorithm at least improves image contrast and/or reduces reconstruction time, relative to a configuration that does not employ this reconstruction algorithm, without adding residual background associated with septal penetration information.

FIGS. 11, 12 and 13 visually show the effect of photon septal penetration via the point spreads function (PSF). FIG. 11 shows a PSF 1102 for direct photons. FIG. 12 shows a PSF 1202 for septal penetration photons. FIG. 13 shows a system PSF 1302 that includes the PSF 1102 and the PSF 1202.

FIGS. 14, 15 and 16 graphically show the effects of septal penetration via profiles. In all three figures, a first axis 1402 represents gray values and a second axis 1404 represents distance in units of pixels. FIG. 14 shows a profile 1406 for the PSF 1102 for direct photons of FIG. 11. FIG. 15 shows a profile 1502 for the PSF 1202 for septal penetration photons of FIG. 12. FIG. 16 shows a system profile 1602 that includes the profile 1406 of FIG. 14 and the profile 1502 of FIG. 15.

The above describes examples in which the reconstruction algorithm discards septa penetration photons (photons penetrating the collimator septa and being detected by the photon detector) during the reconstruction. It is to be appreciated that the algorithm can be extended to additionally, or alternatively, discard other effects from other unwanted photon penetration. For this, $H_p$ can be represented as shown in as EQUATION 6:

$$H_p = H_{geom} + H_{penetr} + \ldots \qquad \text{EQUATION 6:}$$

For example, in one instance the reconstruction algorithm further discards detector side penetration photons (photons reaching the photon detector, but not through the collimator) during the reconstruction. With this example, EQUATION 6 can be rewritten as shown in EQUATION 7:

$$H_p = H_{geom} + H_{penetr} + H_{side}, \qquad \text{EQUATION 7:}$$

where $H_{side}$ represents a side penetration matrix, which represents a probability of a photon reaching the scintillation crystal through a side of the detector, and EQUATION 2 can be rewritten as EQUATION 8 by substituting in EQUATION 3:

$$P = (H_{geom} + H_{penetr} + H_{side})*I + P_{SC} + \xi. \qquad \text{EQUATION 8:}$$

Figure 17:
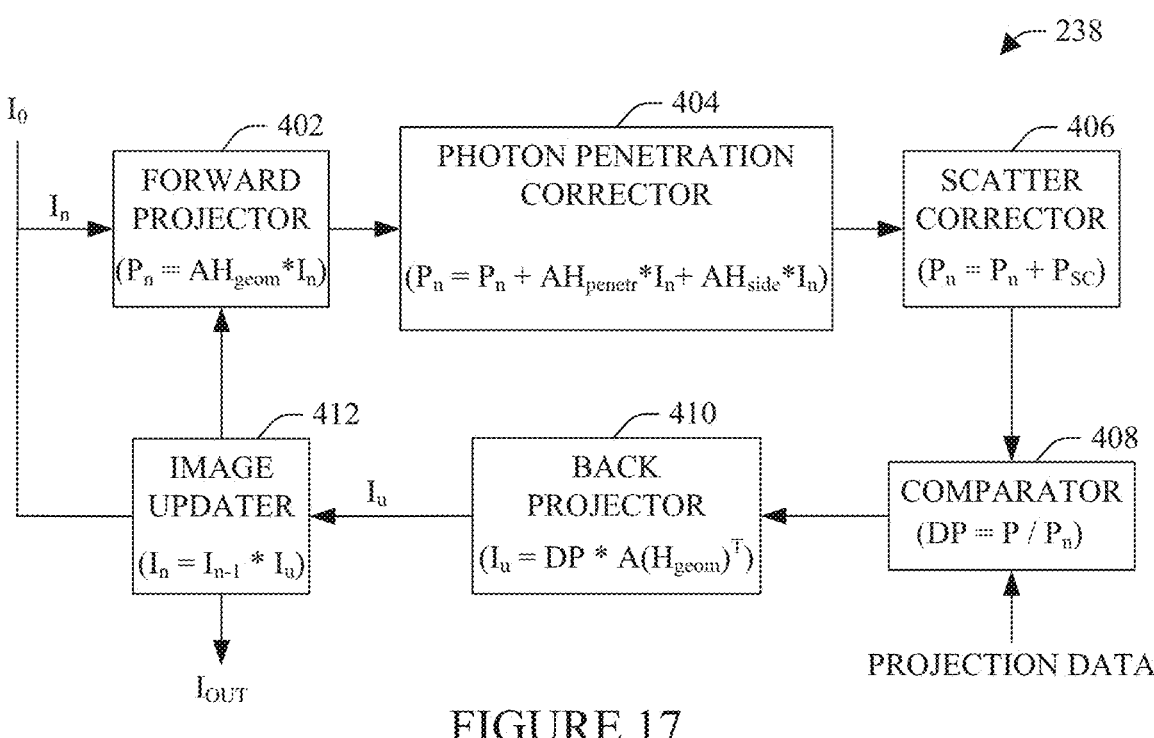
FIG. 17 schematically illustrates another non-limiting example of the reconstructor configured to mitigate effects from photon septal and side penetration, in accordance with an aspect of an embodiment(s) herein.

FIG. 17 schematically illustrates an embodiment of the reconstructor 238 based on EQUATION 8. In this embodiment, the photon septal penetration correction is computed in each iteration and applied to each iteration. In this embodiment, the forward projector 402 forward the projection data by computes $P_n = AH_{geom}*I_n$, the photon penetration corrector 404 corrects for septal penetration correction by computing $P_n = P_n + AH_{penetr}*I_n + AH_{side}*I_n$, the scatter corrector 406 corrects for scatter by computing $P_n = P_n + P_{SC}$, the back projector 410 back projects the comparison of measured and calculated projections comprising scatter and all penetrated photons by computing $DP*A(H_{geo})T$ to compute an image update $I_u$, and the image updater 412 updates the image by adding the image update to the image estimate through via $I_n = I_{n-1}*I_u$.

Figure 18:
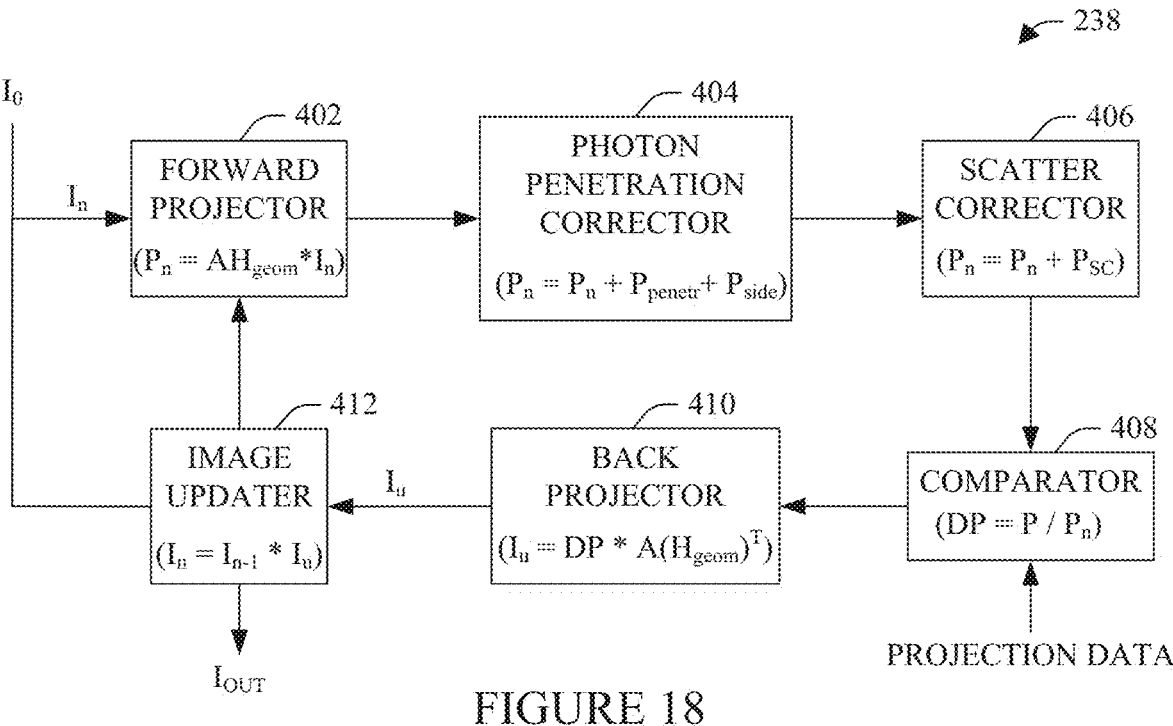
FIG. 18 schematically illustrates another non-limiting example of the reconstructor configured to mitigate septal and side penetration affects, in accordance with an aspect of an embodiment(s) herein.

FIG. 18 schematically illustrates another embodiment of the reconstructor 238 based on EQUATION 9. In this embodiment, the photon septal penetration correction is a predetermined correction that is applied to each iteration. Similar to FIG. 18, the forward projector 402 forward the projection data by computes $P_n = AH_{geom}*I_n$, the scatter corrector 406 corrects for scatter by computing $P_n = P_n + P_{SC}$, the back projector 410 back projects the comparison of measured and calculated projections comprising scatter and all penetrated photons by computing $DP*A(H_{geo})T$ to compute an image update $I_u$, and the image updater 412 updates the image by adding the image update to the image estimate through $I_n = I_{n-1}*I_u$.

However, in this embodiment, the photon penetration corrector 404 pre-determines the photon side penetration correction prior to the iterative reconstruction process. In one instance, the photon penetration corrector 404 pre-determines the photon side penetration correction based on initial estimation of side penetration projections $P_{penetr}$. The photon penetration corrector 404 then corrects for side penetration correction during the iterative reconstruction process by computing $P_n = P_n + P_{penetr} + P_{side}$.

Figures 19, 20:
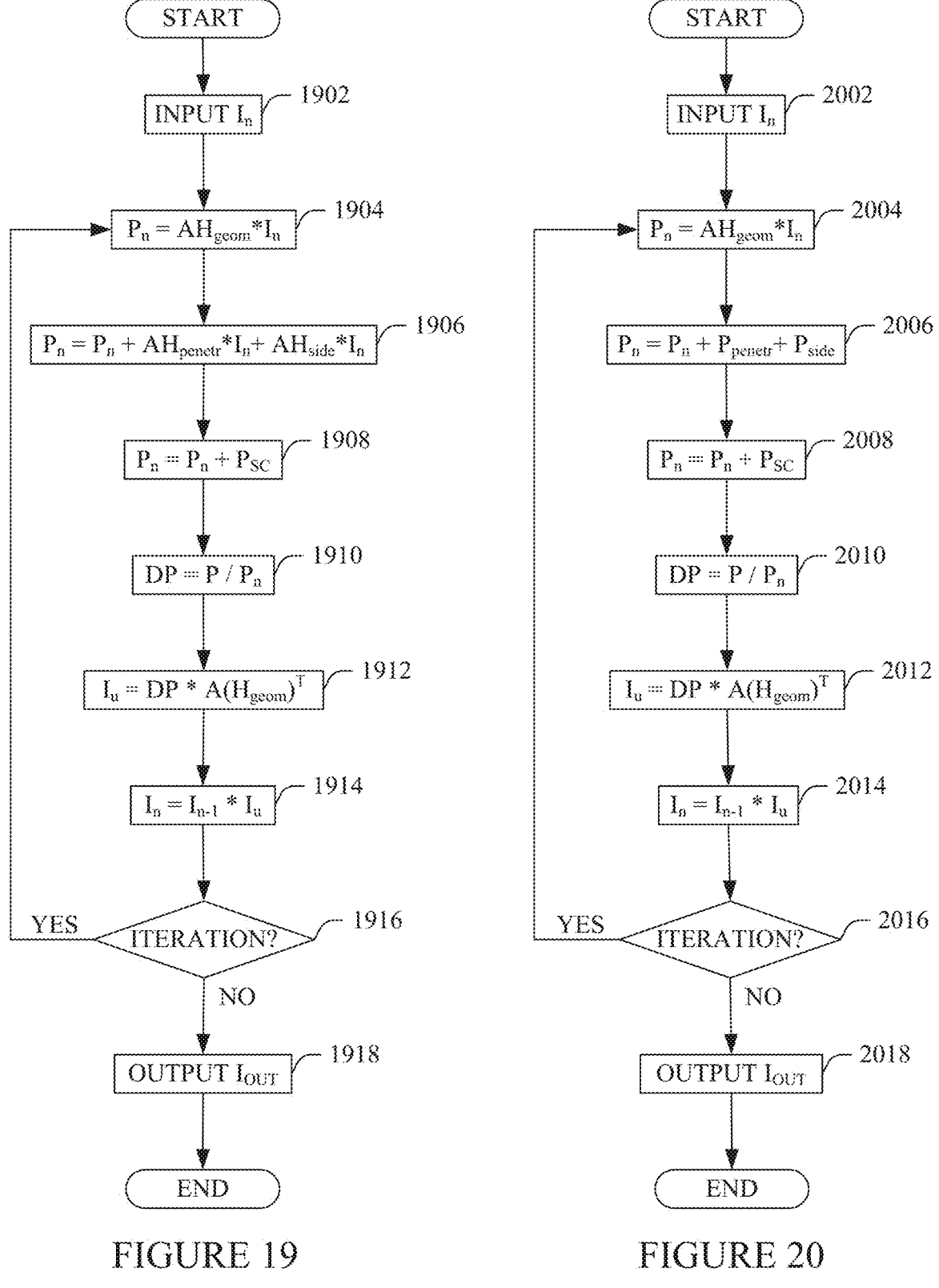
FIG. 19 illustrates yet another non-limiting example of a flow chart for a computer-implemented method for reconstructing SPECT projection data while mitigating effects from photon septal and side penetration, in accordance with an embodiment(s) herein.
FIG. 20 illustrates still another non-limiting example of a flow chart for a computer-implemented method for reconstructing SPECT projection data while mitigating effects from photon septal and side penetration, in accordance with an embodiment(s) herein.

FIG. 19 illustrates a non-limiting example of a flow chart for a computer-implemented method of the dual system matrix (iterative) reconstruction algorithm where septal and side penetration correction is determined and applied to each iteration. It is to be appreciated that the ordering of the acts in the method is not limiting. As such, other orderings are contemplated herein. In addition, one or more acts may be omitted, and/or one or more additional acts may be included.

At 1902, an initial image estimate is obtained as a current image estimate $I_n$, as described herein and/or otherwise. At 1904, the current image estimate is forward projected by computing $P_n = AH_{geom}*I_n$, as described herein and/or otherwise. At 1906, the calculated projection data is corrected for photon septal penetration correction by computing $P_n = P_n + AH_{penetr}*I_n + AH_{side}*I_n$, as described herein and/or otherwise. At 1908, the photon penetration corrected projection data is corrected for scatter by computing $P_n = P_n + P_{SC}$, as described herein and/or otherwise.

At 1910, the penetration and scatter corrected projection data is compared with the measured projection data by determining $DP = P/P_n$. At 1912, the comparison is backprojected by computing $DP*A(H_{geo})T$ to compute an image update $I_u$, as described herein and/or otherwise. At 1914, the image estimate is updated based on the comparison by determining $I_n = I_{n-1}*I_u$, as described herein and/or otherwise. At 1916, it is determined whether there will be another image estimate update, as described herein and/or otherwise.

If it is determined that there will be another image estimate update, then acts 1904-1916 are repeated with the updated image estimate as the current image estimate. If it is determined that there will not be another image estimate update, then at 1918, the updated image estimate $I_{out}$ is output, as described herein and/or otherwise.

FIG. 20 illustrates a non-limiting example of a flow chart for a computer-implemented method of the dual system matrix (iterative) reconstruction algorithm where septal and side penetration correction is pre-determined and applied to each iteration. It is to be appreciated that the ordering of the acts in the method is not limiting. As such, other orderings are contemplated herein. In addition, one or more acts may be omitted, and/or one or more additional acts may be included.

At 2002, an initial image estimate is obtained as a current image estimate $I_n$, as described herein and/or otherwise. Again, values of the pixels/voxels of the initial image estimate can be randomly or arbitrarily initialized, e.g., a uniform image initialized to all ones (1's), etc. At 2004, the current image estimate is forward projected by computing $P_n=AH_{geom}*I_n$, as described herein and/or otherwise. At 2006, the calculated projection data is corrected for photon septal penetration correction by computing $P_n=P_n+P_{penetr}+P_{side}$, where $P_{penetr}$ and $P_{side}$ are precomputed values, as described herein and/or otherwise.

At 2008, the photon septal penetration corrected projection data is corrected for scatter by computing $P_n=P_n+P_{SC}$, as described herein and/or otherwise. At 2010, the photon septal penetration and scatter corrected projection data is compared with the measured projection data by determining $DP=P/P_n$, as described herein and/or otherwise. At 2012, the comparison is backprojected by computing $DP*A(H_{geo})T$ to compute an image update $I_u$, as described herein and/or otherwise. At 2014, the image estimate is updated based on the comparison by determining $I_n=I_{n-1}*I_u$, as described herein and/or otherwise.

At 2016, it is determined whether there will be another image estimate update, as described herein and/or otherwise. If it is determined that there will be another image estimate update, then acts 2004-2016 are repeated with the updated image estimate as the current image estimate. If it is determined that there will not be another image estimate update, then at 2018, the updated image estimate $I_{out}$ is output, as described herein and/or otherwise. As described herein, this reconstruction algorithm at least improves image contrast and/or reduces reconstruction time, relative to a configuration that does not employ this reconstruction algorithm, without adding residual background associated with septal penetration information.

Figure 21:
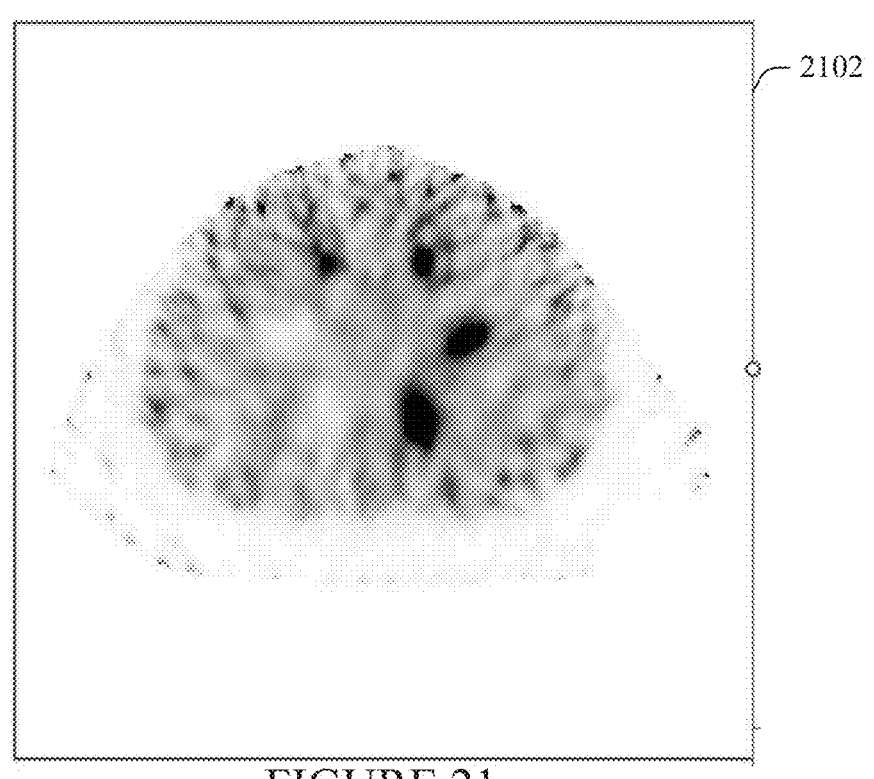
FIG. 21 depicts an image iteratively reconstructed using penetrated photons and attenuation and scatter correction.
Figure 22:
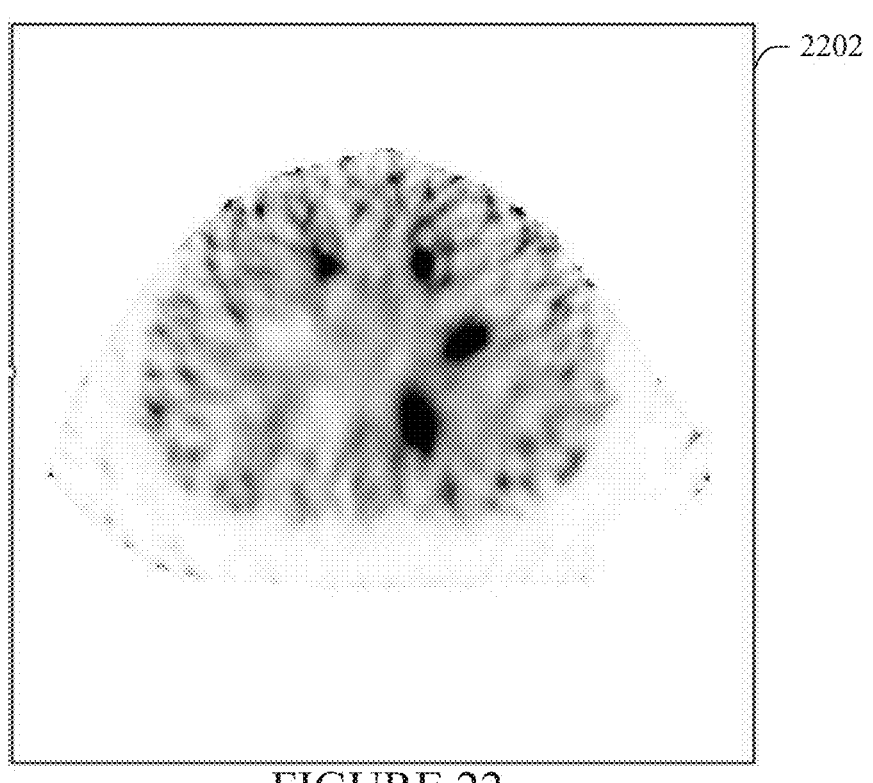
FIG. 22 depicts an image iteratively reconstructed using the dual matrix iterative reconstruction described herein (which corrects for penetrated photons instead of utilizing penetrated photons to create a reconstructed image) and attenuation and scatter correction.

As briefly described herein, the dual system matrix reconstruction algorithm can reduce the number of iterations it takes to reach given image quality based stopping criteria, relative to a configuration that does not employ the dual system matrix reconstruction algorithm. FIGS. 21 and 22 illustrate an example.

Figure 1:
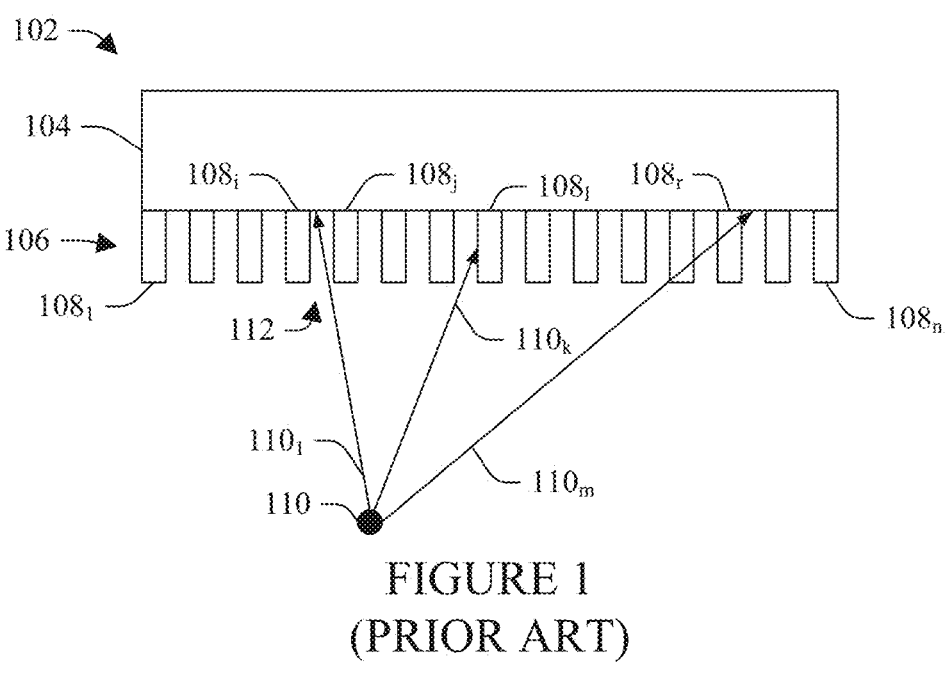
FIG. 1 schematically illustrates a prior art scintillation crystal based scintillation camera and photon septal penetration, in accordance with an aspect of an embodiment(s) herein.

Image 2102 of FIG. 1 and image 2202 of FIG. 22 were both iteratively reconstructed based on a same signal-to-background ratio (contrast) stopping criteria. The image of FIG. 21 was reconstructed using penetrated photons and attenuation and scatter correction. The image of FIG. 22 was reconstructed using the dual matrix iterative reconstruction described herein (which corrects for penetrated photons instead of utilizing penetrated photons to create a reconstructed image) and attenuation and scatter correction.

The iterative reconstruction of the image of FIG. 22 reached the same contrast in four (4) EM iterations with 10 subsets, as the iterative reconstruction of the image of FIG. 21 in eight (8) EM iterations with 10 subsets. In other words, for images with approximately a same signal-to-background ratio, the dual system matrix reconstruction algorithm utilized half the number of iterations in the iterative reconstruction to reach the same contrast. In one instance, this corresponds to half of the reconstruction time.

In addition to reducing the number of iterations to reach the given a signal-to-background ratio criteria, a contrast of the image of FIG. 22 is greater than the contrast of the image of FIG. 21. In addition to reducing the number of iterations to reach the given a signal-to-background ratio criteria and having a better contrast, a contrast-to-noise ratio of the image of FIG. 22 is equivalent to the contrast-to-noise ratio of the image of FIG. 21.

In the above example, the image quality convergence criteria is the signal-to-background ratio. In another instance, the image quality convergence criteria is the contrast level. In another instance, the image quality convergence criteria is the contrast-to-noise ratio. In another instance, the image quality convergence criteria is a weighed combination of one or more of the signal-to-background ratio, the contrast level, and the contrast-to-noise ratio, and/or other image quality criteria. In another instance, the convergence criteria instead is the number of reconstruction iterations.

The above can be implemented by way of computer readable instructions, encoded, or embedded on the computer readable storage medium, which, when executed by a computer processor, cause the processor to carry out the described acts or functions. Additionally, or alternatively, at least one of the computer readable instructions is carried out by a signal, carrier wave or other transitory medium, which is not computer readable storage medium.

As used herein, an element or step recited in the sing and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include such additional elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present disclosure. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

What is claimed is:

1. A single photon emission tomography (SPECT) imaging system, comprising:
   a detector configured to receive photons emitted by a radiopharmaceutical in an examination region of the SPECT imaging system and convert the received photons to measured projection data;
   a collimator with septa spatially arranged with respect to each other and the detector to provide channels to pass photons emitted by a radiopharmaceutical that traverse the channels and absorb photons emitted by a radiopharmaceutical that impinge the septa,
   wherein a first sub-set of the photons emitted by the radiopharmaceutical traverse the channels without impinging the septa and are directly received by the detector,
   wherein a second sub-set of the photons emitted by the radiopharmaceutical traverse the septa and are received by the detector; and
   a reconstructor configured to discard scatter photons, discard the second sub-set of photons traversing the septa, and iteratively reconstruct an image based on a first subset of photons that are directly received by the detector.

2. The SPECT imaging system of claim 1, the reconstructor, including:
   a forward projector configured to receive an initial image estimate as a current image estimate and forward project the current image estimate to create an estimate of projection data;
   a photon penetration corrector configured to correct the estimate of the projection data for the second sub-set of the photons;
   a scatter corrector configured to correct the estimate of the projection data for the scatter photons;
   a comparator configured to compare the corrected estimate of the projection data and the measured projection data;
   a back projector configured to backproject the comparison of the corrected estimate of the projection data and the measured projection data to generate an image update; and
   an image updater configured to update the current image estimate based on the image update.

3. The SPECT imaging system of claim 2, wherein the photon penetration corrector is further configured to compute projections corresponding to the second sub-set of the photons each iteration and correct the estimate of the projection data for the second sub-set of the photons based on the computed projections each iteration.

4. The SPECT imaging system of claim 3, wherein the photon penetration corrector, each iteration, computes the projections corresponding to the second sub-set of the photons based on a system matrix for photons traversing the septa, an attenuation coefficient matrix, and the current image estimate.

5. The SPECT imaging system of claim 2, wherein the photon penetration corrector is further configured to obtain a predetermined set of projections corresponding to the second sub-set of the photons and, for each iteration, correct the estimate of the projection data for the second sub-set of the photons based on the predetermined set of projections.

6. The SPECT imaging system of claim 5, wherein the photon penetration corrector, prior to correcting the estimate of the projection data, computes the predetermined set of projections corresponding to the second sub-set of the photons based on a system matrix for photons traversing the septa, an attenuation coefficient matrix, and the current image estimate.

7. The SPECT imaging system of claim 2, wherein a third sub-set of the photons emitted by the radiopharmaceutical are received at a side of the detector, and the photon penetration corrector is further configured to correct the estimate of the projection data for the third sub-set of the photons.

8. The SPECT imaging system of claim 7, wherein the photon penetration corrector is further configured to compute projections corresponding to the third sub-set of the photons each iteration and correct the estimate of the projection data for the third sub-set of the photons based on the computed projections each iteration.

9. The SPECT imaging system of claim 7, wherein the photon penetration corrector is further configured to obtain a predetermined set of projections corresponding to the third sub-set of the photons and, for each iteration, correct the estimate of the projection data for the third sub-set of the photons based on the predetermined set of projections.

10. A computer-implemented method for a SPECT iterative reconstruction, comprising:
   forward projecting a current image estimate to estimate projection data;
   correcting the estimated projection data for collimator photon penetration;
   correcting the estimated projection data for scattered photons;
   comparing the corrected estimated projection data with measured projection data, wherein the measured projection data includes projections corresponding to direct photons passing through channels between septa in a collimator and septal photons traversing the septa and scattered photons;
   backprojecting the comparison of the corrected estimated projection data and the measured projection data taking into account only the photons emitted by a radiopharmaceutical traverse the channels without impinging the septa and are directly received by a detector to generate an image update;
   updating the current image estimate with the image update; and
   repeating the steps of forward projecting, correcting for collimator photon penetration, correcting for scatter photons, comparing, backprojecting and updating until iteration termination criteria is satisfied.

11. The computer-implemented method of claim 10, the step of correcting for collimator photon penetration, further comprising:
   computing, each iteration, septal photon projections corresponding to the septal photons; and
   correcting, each iteration, the estimated projection data based on the septal photon projections.

12. The computer-implemented method of claim 10, the step of correcting for collimator photon penetration, further comprising:
   computing, before a main iterative loop, septal photon projections corresponding to the septal photons; and
   correcting, each iteration, the estimated projection data based on the septal photon projections.

13. The computer-implemented method of claim 10, wherein the measured projection data further includes side penetrating photons, and further comprising:
   computing, each iteration, side photon projections corresponding to the side photons; and
   correcting, each iteration, the estimated projection data for side photon penetration.

14. The computer-implemented method of claim 10, wherein the measured projection data further includes side penetrating photons, and further comprising:
   computing, only once, side photon projections corresponding to the side photons; and
   correcting, each iteration, the estimated projection data for side photon penetration.

15. A non-transitory computer readable medium encoded with computer executable instructions, which, when executed by a processor, cause the processor to: forward project a current image estimate to estimate projection data; correct the estimated projection data for collimator photon penetration; correct the estimated projection data for scatter photon; compare the corrected estimated projection data with measured projection data, wherein the measured projection data includes projections corresponding to direct photons passing through channels between septa in a collimator and septal photons traversing the septa and scattered photons; backproject the comparison of the corrected estimated projection data and the measured projection data taking into account only the photons emitted by a radiopharmaceutical traverse the channels without impinging the septa and are directly received by a detector to generate an image update; update the current image estimate with the image update; and repeat the steps of forward projecting, correcting for collimator photon penetration, correcting for scatter photons, comparing, backprojecting and updating until iteration termination criteria is satisfied.

16. The computer readable medium of claim 15, wherein the computer executable instructions further cause the processor to:
   compute, each iteration, septal photon projections corresponding to the septal photons; and
   correct, each iteration, the estimated projection data based on the septal photon projections.

17. The computer readable medium of claim 16, wherein the computer executable instructions further cause the processor to:
   compute, before a main iterative loop, septal photon projections corresponding to the septal photons; and
   correct, each iteration, the estimated projection data based on the septal photon projections.

18. The computer readable medium of claim 15, wherein the measured projection data further includes side penetrating photons, and the computer executable instructions further cause the processor to:
   correct the estimated projection data for side photon penetration.

19. The computer readable medium of claim 18, wherein the computer executable instructions further cause the processor to:
   compute, each iteration, side photon projections corresponding to the side photons; and correct, each iteration, the estimated projection data for side photon penetration.

20. The computer readable medium of claim 18, wherein the computer executable instructions further cause the processor to:

compute, only once, side photon projections corresponding to the side photons; and correct, each iteration, the estimated projection data for side photon penetration.

\* \* \* \* \*